United States Patent [19]

Lee, deceased et al.

[11] Patent Number: 4,831,635
[45] Date of Patent: May 16, 1989

[54] TRELLIS CODES WITH SPECTRAL NULLS

[75] Inventors: Ting-Ann Lee, deceased, late of Da-Shig, Tao-Yuan, Taiwan, by Yuan-Jen D. Lee, administratrix; Arthur R. Calderbank, Plainfield, N.J.

[73] Assignees: American Telephone and Telegraph Company, New York, N.Y.; AT&T Bell Laboratories, Murray Hill; AT&T Information Systems Inc., Morristown, both of N.J.

[21] Appl. No.: 914,337

[22] Filed: Oct. 2, 1986

[51] Int. Cl.$^4$ .......................................... H04L 25/34
[52] U.S. Cl. ........................................ 375/19; 375/37; 371/56
[58] Field of Search .................... 375/17, 19, 37, 26, 375/27, 34, 39; 371/43, 56, 55

[56] References Cited

U.S. PATENT DOCUMENTS

| | | | |
|---|---|---|---|
| 3,521,274 | 7/1970 | Sawai | 371/56 |
| 4,528,550 | 7/1985 | Graves et al. | 375/17 |
| 4,562,426 | 12/1985 | Forney, Jr. | 375/39 |
| 4,581,601 | 4/1986 | Calderbank et al. | 375/94 |

Primary Examiner—Benedict V. Safourek
Assistant Examiner—Marianne Huseman
Attorney, Agent, or Firm—Ronald D. Slusky

[57] ABSTRACT

In a data transmission system using a predetermined trellis code, the output signal points are selected from a predetermined alphabet representing $(k+n)$-bit input words by using the values of n bits of each input word, and bits from previous input words, to identify a particular one of $2^m$ subsets of the signaling alphabet $m>n$. The other k bits of the input word identify a pair of signal points of the identified subset. The sum of the components of one point of each pair is no less than zero and the sum of the components of the other point of that pair is no greater than zero. A running sum of the components of the signal points previously generated is maintained. If at any point in time the running sum is greater than zero, the signal point of the identified pair whose component sum is no greater than zero is generated, and vice versa. This scheme provides a channel-coded signal having a spectral null at dc.

34 Claims, 3 Drawing Sheets

TRELLIS CODES WITH SPECTRAL NULLS

BACKGROUND OF THE INVENTION

The present invention relates to data transmission systems and, in particular, to channel coding in such systems.

Much attention has been focused in recent years on channel codes which provide so-called coding gain. Prominent among these are the so-called "trellis" codes described in such papers as G. Ungerboeck, "Channel Coding With Multilevel/Phase Signals," *IEEE Trans. Information Theory, IT*-28, 1982, pages 55–67; A. R. Calderbank and N. J. A. Sloane, "A New Family of Codes for Dial-Up Voice Lines," *Proc. IEEE Global Telecomm. Conf.*, November 1984, pages 20.2.1–20.2.4; A. R. Calderbank and N. J. A. Sloane, "Four-Dimensional Modulation With an Eight-State Trellis Code," *AT&T Technical Journal*, Vol. 64, No. 5, May–June 1985, pages 1005–1018; A. R. Calderbank and N. J. A. Sloane, "An Eight-Dimensional Trellis Code," *Proc. IEEE*, Vol. 74, No. 5, May 1986, pages 757–759; and L.-F. Wei, "Rotationally Invariant Convolutional Channel Coding With Expanded Signal Space—Part I: 180 Degrees and Part II: Nonlinear Codes," *IEEE J. Select. Areas Commun.*, Vol. SAC-2, September 1984, pages 659–686, all of which are hereby incorporated by reference. Commercial use of these codes has, for the most part, been concentrated in voiceband data sets and other carrier data systems. It would, however, be desirable to also use these codes in baseband systems, such as local area networks and telephone interoffice exchange systems. An impediment to the use of trellis codes in baseband systems, however, is the fact that the coded signal generated by conventional trellis coding techniques has a significant component at dc. This is disadvantageous from a number of standpoints. For example, transformer coupling—which is needed, or at least desirable, in many applications—could not be used since transformers will not pass dc. In addition, transmission errors can occur if the remote signal ground reference is not accurate. Moreover, the inclusion of signal power at dc results in a waste of signal power in most detector configurations.

SUMMARY OF THE INVENTION

The present invention is directed to a trellis coding arrangement whose line signal has a spectral null—illustratively at dc—advantageously enabling trellis codes to be used in systems in which the presence of a significant dc component is a problem. In accordance with the invention, the signal point to be transmitted is determined as a function of not only the input bits, at least ones of which have been trellis coded, but also as a function of a running value which is a function of the components of the signal points previously transmitted.

In an illustrative embodiment of the invention, output signal points representing $(k+n)$-bit input words are generated. The values of n bits of each input word, and at least one bit of a previous input word, are used to identify a particular one of $2^m$ subsets of the signaling alphabet $m>n$. The other k bits of the input word identify a plurality of signal points of the identified subset. Illustratively, the other k bits identify a pair of signal points with the sum of the components of one point of each pair being no less than, i.e., at least equal to, a particular predetermined value and the sum of the components of the other point of that same pair being no greater than that predetermined value. If at any point in time the aforementioned running value—which is illustratively a running sum of the components of the previously transmitted signal points—is greater than the predetermined value, the signal point of the identified pair whose component sum is no greater than the predetermined value is generated. Conversely, if the running sum is less than the predetermined value, the signal point of the identified pair whose component sum is at least equal to the predetermined value is generated. In the present illustrative embodiment, the predetermined value is zero. Therefore, if the component sum is greater (less) than zero, a signal point whose component sum is no greater (no less) than zero is generated. As elucidated in further detail hereinafter, this scheme provides a channel-coded signal having a spectral null at dc, as desired.

DETAILED DESCRIPTION

Figure 1:
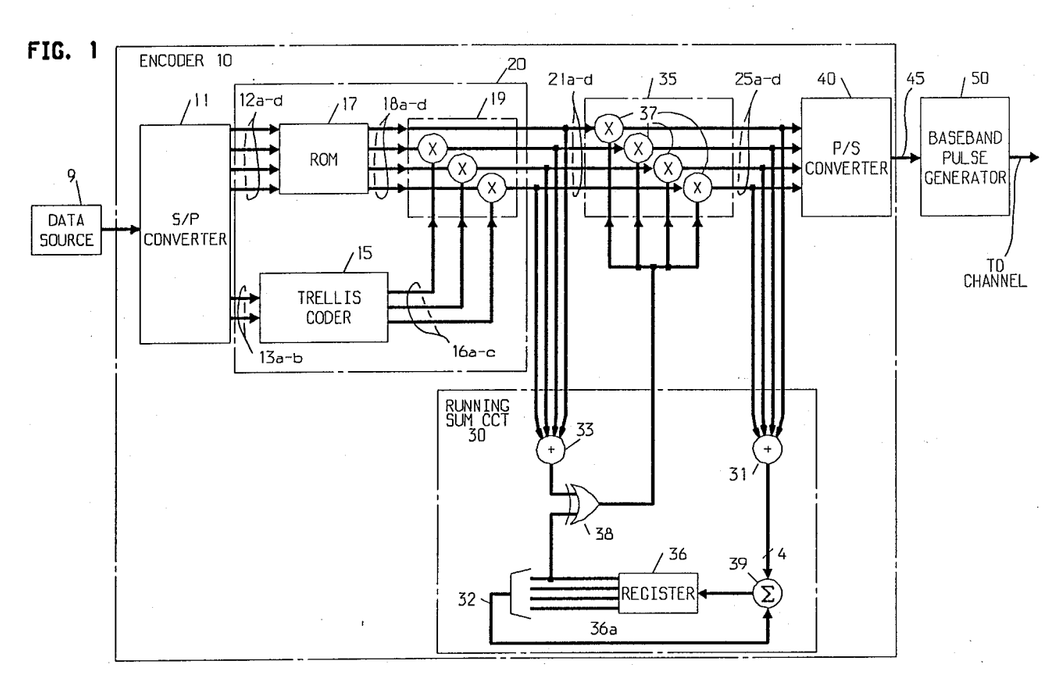
FIG. 1 is a block diagram of a data transmitter embodying the principles of the invention.

Encoder 10 of FIG. 1 receives data in the form of a serial bit stream from a data source 9. This bit stream is applied to serial-to-parallel (S/P) converter 11, which generates a sequence of $(k+n)$-bit words. Illustratively, $k=4$ and $n=2$, and converter 11 generates these 6-bit words in parallel on one-bit leads 12a–d and 13a–b, four of those bits appearing on leads 12a–d and the other two on leads 13a–b. The sequence of input words on leads 12a–d and 13a–b is processed in a manner to be described in detail hereinbelow. For the present, however, it suffices to note that, responsive to those input words, a lattice point generator 20 generates 4-dimensional points, or 4-tuples, taken from the lattice of odd integers. Each of the components of each lattice point thus generated appears on a respective one of the four multi-bit leads 21a–d. Each lattice point on leads 21a–d passes through sign inverter circuit 35 which, operating under the control of running sum circuit 30, either passes the lattice point through unchanged or inverts the sign of each of its components, thereby generating a different point in the lattice. The output of circuit 35 on multi-bit leads 25a–d represents the signal point to be transmitted.

A sequence of output signals each representing one of the signal points to be transmitted is thereupon generated and applied to the desired transmission channel. In particular, the signal point on leads 25a–d is applied to parallel-to-serial (P/S) converter 40, which generates a serial bit stream on encoder output lead 45. The "0"s and "1"s of that bit stream are applied to a conventional baseband pulse generator 50 which generates a baseband line signal appropriate for the transmission of those "0"s and "1"s over the transmission channel.

Each of the four components of the signal points in this embodiment takes on one of the four values $1, -1, 3, -3$, examples being the signal points $(1,3,-3,1)$ and $(-3,3,3,-3)$. The alphabet of signal points thus has $4^4 = 256$ elements. This alphabet is illustratively divided into $2^m$ subsets, wherein $m > n$. Illustratively, $m = 3$ so that there are $2^3 = 8$ subsets and the alphabet has $2^{(k+m+l)}$ signal points.

To arrive at the subsets, the 4-tuples are first divided into sixteen parts $S(e_1, e_2, e_3, e_4)$ where $e_i = 0$ or 1. That is, we denote those sixteen parts $S(0000)$, $S(0001)$, $S(0010)$, etc. A particular 4-tuple $(x_1, x_2, x_3, x_4)$ belongs to a particular part $S(e_1, e_2, e_3, e_4)$ if $x_i$ is congruent to $(-1)^{e_i}$ (modulo 4). Thus, for example, a particular 4-tuple belongs to the part $S(0011)$ if the first two components of the 4-tuple are congruent to $(-1)^0$ (modulo 4)—which encompasses the components $+1$ and $-3$—and the second two components of the 4-tuple are congruent to $(-1)^1$ (modulo 4)—which encompasses the components $-1$ and $+3$. $S(0011)$ thus has the following sixteen elements:

```
(1   1  -1  -1)   (1  -3   3  -1)
(-3  1  -1  -1)   (1  -3  -1   3)
(1  -3  -1  -1)   (1   1   3   3)
(1   1   3  -1)   (-3 -3   3  -1)
(1   1  -1   3)   (-3 -3  -1   3)

(-3 -3  -1  -1)   (-3  1   3   3)
(-3  1   3  -1)   (1  -3   3   3)
(-3  1  -1   3)   (-3 -3   3   3)
```

The sixteen parts are then grouped into $m = 8$ subsets as follows:

| | |
|---|---|
| $S_1 = S(0000) \cup S(1111)$ | $S_5 = S(0001) \cup S(1110)$ |
| $S_2 = S(0011) \cup S(1100)$ | $S_6 = S(0010) \cup S(1101)$ |
| $S_3 = S(1010) \cup S(0101)$ | $S_7 = S(0100) \cup S(1011)$ |
| $S_4 = S(1001) \cup S(0110)$ | $S_8 = S(1000) \cup S(0111)$ | where the symbol "$\cup$" means "union of". Thus subset $S_2$ includes the sixteen 4-tuples of part $S(0011)$ listed above along with the sixteen 4-tuples arrived at by reversing the sign of each component of that part. By way of example, Table I shows the elements of subsets $S_1$, $S_2$ and $S_8$, with each of the subsets being re-divided into two halves. Specifically, one half of each subset, denoted with a superscript "+", includes all points whose components sum to a positive number and the other half of that subset, denoted with a superscript "−", includes all points whose components sum to a negative number. Points whose components sum to zero are each assigned to one of the two halves arbitrarily. (In this table, "−1"s and "−3"s are represented as "$\bar{1}$"s and "$\bar{3}$"s, respectively, to save room.)

TABLE I

| Input bit pattern | $S_1^+$ | $S_1^-$ | $S_2^+$ | $S_2^-$ | $S_8^+$ | $S_8^-$ |
|---|---|---|---|---|---|---|
| 0000 | (1111) | ($\bar{1}\bar{1}\bar{1}\bar{1}$) | (11$\bar{1}\bar{1}$) | ($\bar{1}\bar{1}$11) | ($\bar{1}$111) | (1$\bar{1}\bar{1}\bar{1}$) |
| 0001 | (3111) | ($\bar{3}\bar{1}\bar{1}\bar{1}$) | (311$\bar{1}$) | ($\bar{3}\bar{1}\bar{1}$1) | (3111) | ($\bar{3}\bar{1}\bar{1}\bar{1}$) |
| 0010 | (1311) | ($\bar{1}\bar{3}\bar{1}\bar{1}$) | (113$\bar{1}$) | ($\bar{1}\bar{1}\bar{3}$1) | (13$\bar{1}$1) | ($\bar{1}\bar{3}$1$\bar{1}$) |
| 0011 | (113$\bar{1}$) | ($\bar{1}\bar{1}\bar{3}$1) | (1113) | ($\bar{1}\bar{1}\bar{1}\bar{3}$) | (11$\bar{3}$1) | ($\bar{1}\bar{1}$3$\bar{1}$) |
| 0100 | (111$\bar{3}$) | ($\bar{1}\bar{1}\bar{1}$3) | ($\bar{1}$311) | (1$\bar{3}\bar{1}\bar{1}$) | (111$\bar{3}$) | ($\bar{1}\bar{1}\bar{1}$3) |
| 0101 | (33$\bar{1}\bar{1}$) | ($\bar{3}\bar{3}$11) | (31$\bar{3}$1) | ($\bar{3}\bar{1}$3$\bar{1}$) | (3311) | ($\bar{3}\bar{3}\bar{1}\bar{1}$) |
| 0110 | (3$\bar{1}$31) | ($\bar{3}$1$\bar{3}\bar{1}$) | (1313) | ($\bar{1}\bar{3}\bar{1}\bar{3}$) | (3131) | ($\bar{3}\bar{1}\bar{3}\bar{1}$) |
| 0111 | (31$\bar{1}$3) | ($\bar{3}\bar{1}$1$\bar{3}$) | (31$\bar{1}$3) | ($\bar{3}\bar{1}$1$\bar{3}$) | (311$\bar{3}$) | ($\bar{3}\bar{1}\bar{1}$3) |
| 1000 | ($\bar{1}$331) | (1$\bar{3}\bar{3}\bar{1}$) | ($\bar{1}$33$\bar{1}$) | (1$\bar{3}\bar{3}$1) | ($\bar{1}$331) | (1$\bar{3}\bar{3}\bar{1}$) |
| 1001 | ($\bar{1}$3$\bar{1}$3) | (1$\bar{3}$1$\bar{3}$) | (331$\bar{1}$) | ($\bar{3}\bar{3}\bar{1}$1) | ($\bar{1}$313) | (1$\bar{3}\bar{1}\bar{3}$) |
| 1010 | ($\bar{1}$133) | (1$\bar{1}\bar{3}\bar{3}$) | (1133) | ($\bar{1}\bar{1}\bar{3}\bar{3}$) | (1133) | ($\bar{1}\bar{1}\bar{3}\bar{3}$) |
| 1011 | (333$\bar{1}$) | ($\bar{3}\bar{3}\bar{3}$1) | (333$\bar{1}$) | ($\bar{3}\bar{3}\bar{3}$1) | (3331) | ($\bar{3}\bar{3}\bar{3}\bar{1}$) |
| 1100 | (331$\bar{3}$) | ($\bar{3}\bar{3}\bar{1}$3) | (3313) | ($\bar{3}\bar{3}\bar{1}\bar{3}$) | (3313) | ($\bar{3}\bar{3}\bar{1}\bar{3}$) |
| 1101 | (3133) | ($\bar{3}\bar{1}\bar{3}\bar{3}$) | (3133) | ($\bar{3}\bar{1}\bar{3}\bar{3}$) | (3133) | ($\bar{3}\bar{1}\bar{3}\bar{3}$) |
| 1110 | ($\bar{1}$333) | (1$\bar{3}\bar{3}\bar{3}$) | ($\bar{1}$333) | (1$\bar{3}\bar{3}\bar{3}$) | (1333) | ($\bar{1}\bar{3}\bar{3}\bar{3}$) |
| 1111 | (3333) | ($\bar{3}\bar{3}\bar{3}\bar{3}$) | (3333) | ($\bar{3}\bar{3}\bar{3}\bar{3}$) | (3333) | ($\bar{3}\bar{3}\bar{3}\bar{3}$) |

Referring again to FIG. 1, lattice point generator 20 includes read-only memory (ROM) 17 and trellis coder 15. The two bits on leads 13a–b are passed into trellis coder 15 which identifies, in a manner to be described in further detail hereinbelow, a particular one of the eight subsets $S_1$ through $S_8$. Coder 15 is thus a so-called rate $\frac{2}{3}$ trellis coder. Given that there are $2^5 = 32$ signal points in each subset, S/P converter 11, if this were a conventional trellis coding arrangement, typically would apply five bits to ROM 17 and those five bits would be used to identify a particular one of the 32 signal points in the identified subset.

In accordance with the present invention, however, an input word having less than five bits is applied to the ROM so that the input word identifies a plurality of signal points in the subset. Specifically, only four bits are applied to ROM 17—the bits on leads 12a–d—and those bits are used to identify a particular signal point pair within the identified subset. (As will be seen, the particular signal point pair is identified by generating on ROM output leads 18a–d one of the two signal points of that pair.) In this embodiment, the signal points are paired up within each subset in such a way that the component sum, i.e., the arithmetic sum of the components, of one of the two signal points in a pair is equal and opposite to the component sum of the other signal point of the pair, the points of each pair being adjacent to one another in Table I. Indeed, in the present embodiment each signal point in a pair can be derived from the other simply by inverting the sign of each component. As an example, subset $S_2$ includes the signal point pair $(3,3,-3,1)/(-3,-3,3,-1)$, whose component sums are 4 and $-4$, respectively. In accordance with the broad aspects of the invention, however, it is sufficient that the component sum of one of the signal points of each pair is at least equal to a particular predetermined value N and the component sum of the other of said signal points is no greater than N.

The assignment of 4-bit word values to signal point pairs could be made arbitrarily in each subset. In the present embodiment, however, the assignment is made such that each of the sixteen possible combinations of "0"s and "1"s on leads 12a–d is assigned to a particular pattern of "1"s and "3"s, ignoring signs, across all subsets. Thus, for example, as shown in Table I, the bit pattern 0000 corresponds to all points each of whose components is 1 or $-1$.

In order to determine which signal point of the identified pair is to be output by encoder 10, a running value which is a function of the components of the signal points previously generated by the encoder is maintained, that running value illustratively being a running sum. If at any point in time that running value is greater (less) than 0, the encoder outputs the signal point of the identified pair whose component sum is less (greater) than 0, thus making the running value less positive (negative). If the running value is zero, or if the component sum of each point of the identified pair is zero, then the encoder outputs an arbitrary one of the points of the identified pair. Thus if the running value is not already zero, then it is driven toward zero. (For the general case, it can be stated that if at any point in time the running sum is at least equal to N, the encoder outputs a signal point whose component sum is no greater than N while if the running sum is no greater than N, the encoder outputs a signal point whose component sum is no less than N.)

The above-described coding scheme has at least two important characteristics. Firstly, as with any well-designed trellis coding scheme, it provides so-called "coding gain", thereby yielding an increase in signal-to-noise ratio, and thus better performance. That is, the ratio of (a) the minimum squared Euclidean distance between successively transmitted signal points and (b) the average power of the transmitted signal points is greater than in an "un-coded" system, i.e., a system in which the six bits on leads 12a–d and 13a–b would be coded using a $2^6=64$-element alphabet.

Specifically, if we assume the 64-element alphabet that would be used in the uncoded case to be comprised of (a) the sixteen 4-tuples each of whose components is either +1 or −1, and b) forty-eight of the 4-tuples having three components each of which is +1 or −1 and one component of which is +3 or −3, the coding gain provided by the present system can be shown to be 3.01 db.

Yet even greater coding gain could be achieved by using a 128-element alphabet based on the same lattice as the present 256-element alphabet; a concomitant of the present invention is a certain coding inefficiency resulting from the fact that either of two signal points can be generated to represent an input word. Advantageously, however, something is gained in the process of "giving up" a relatively small amount of coding gain.

Specifically, since the aforementioned running sum is guaranteed to have an upper and lower bound—it will never exceed 12 and will never be less than −12—the output of the coder spectrum, and thus the spectrum of the line signal applied to the channel, is guaranteed to have a spectral null at dc. (On this point, see, for example, J. Justesen, "Information Rates and Power Spectra of Digital Codes," *IEEE Trans. Information Theory*, IT-28, 1982, pages 457–472, and G. Pierobon, "Codes for Zero Spectral Density at Zero Frequency," *IEEE Trans. Information Theory*, IT-30, 1984, pages 435–439.) As mentioned above, the provision of a spectral null at dc is a must in many data transmission applications. Advantageously, then, the present invention opens up the possibility of using trellis codes—and thus the obtaining of coding gain—in such applications.

In appreciating how encoder 10 implements the foregoing, it is useful to first consider the operation of running sum circuit 30. The task of this circuit is to ensure that the component sum of the signal point at the encoder output is positive if the running sum is currently negative and vice versa. To this end, circuit 30 includes a register 36 which holds the current running sum. The sign of that sum, illustratively represented by a sign bit on one of the register 36 output leads 36a, is applied to one input of exclusive OR gate 38. The other input of gate 38 represents the sign of the component sum of the lattice point on leads 21a–d, that input being the sign bit output of an adder 33. The output of gate 38 extends to each one of a plurality of multipliers 37 within sign inverter circuit 35. Depending on the value of that bit, each one of multipliers 37 either allows a respective one of the lattice point components on leads 21a–d to pass on to P/S converter 40 unchanged or, alternatively, inverts the sign of that component.

In operation, then, if the running sum and the component sum of the signal point currently being output by generator 20 are either both positive or both negative, the output of gate 38 is negative and the signs of the components of that lattice point are all inverted. The signal point that is output, then, instead of being the lattice point on leads 21a–d is the other signal point of the same pair within the selected subset. Therefore, when the component sum of the resulting signal point on leads 25a–d generated by an adder 31 within running sum circuit 30 is thereafter combined in an accumulator 39 with the present running sum, provided on multi-bit lead 32, the running sum is driven toward zero. The new value is then stored in register 36. If, on the other hand, the running sum is positive (negative) and the component sum of the current lattice point on leads 21a–d sum is negative (positive), then the output of gate 38 is positive. The components on leads 21a–d thus pass unchanged through inverter circuit 35 to P/S converter 40, and the running sum is, again, driven toward zero. If the running sum and/or the component sum is zero at any time, the output of gate 38 may be "0" or "1", depending on how zero is represented by adder 33 and register 36. An arbitrary one of the two signal points of the identified pair is thus selected, as noted above.

(If desired, a divide-by-2 circuit (not shown) could be interposed between adder 31 and accumulator 39. This will have no effect of the value of the sign bit on lead 37 but may make the implementation of accumulator 39 and register 36 a bit simpler since the data words being processed will have one less bit.)

In order to appreciate how a signal point greater than zero is embodied, it is useful to again consider the signaling alphabet. Referring, for example to Table I, it may be noted that, given any particular first one of the subsets, every signal point in any second one of the subsets can be arrived at via a particular sign pattern change associated with that other subset. Thus, for example, any of the signal points in subset $S_2$ can be derived from a particular signal point in subset $S_1$ by changing the sign of the last two components. Thus signal point generator 20 could be configured to (a) store in ROM 17 the signal points of a particular one of the subsets, e.g., subset $S_1$, (b) retrieve a particular one of those 32 stored signal points from ROM 17, and (c) configure trellis coder 15 to generate the sign pattern change corresponding to the subset from which the output signal point is to come.

Signal point generator 20 can be made even simpler, however, as a result of the fact that only one signal point of each of the signal point pairs within each subset need ever be generated on leads 21a–d. This can be see from the following:

Suppose, for example, that the running sum is currently positive and that the lattice point on leads 21a–d is the point (−1,1,1,1) (from subset $S_3$). Since the component sum of that lattice point is also positive, circuit 30 will cause multipliers 37 to invert the signs of all the components of the lattice point (−1,1,1,1) resulting in the generation on leads 25a–d of the other signal point of the same pair, i.e., the signal point (1,−1,−1,−1). If, on the other hand, the lattice point on leads 21a–d were the point (1,−1,−1,−1), circuit 30 would not cause multipliers 37 to invert the signs because the component sum of (1,−1,−1,−1) is negative. Thus, once again, the point $(1,-1,-1,-1)$ would be applied to P/S converter 40.

As a consequence of the foregoing, ROM 17 need only store one of the signal points of each pair within a subset and trellis coder 15 need only provide a sign bit pattern for three of the four components output by ROM 17. In the present illustrative embodiment, for example, the half of $S_1$ denoted $S_1$ in Table I is stored in ROM 17 and trellis coder 15 generates sign bits for leads 18b–d in accordance with the following TABLE II:

TABLE II

| To generate a point in subset | use the sign bit pattern |
|---|---|
| $S_1$ | 000 |
| $S_2$ | 011 |
| $S_3$ | 101 |
| $S_4$ | 110 |
| $S_5$ | 001 |
| $S_6$ | 010 |
| $S_7$ | 100 |
| $S_8$ | 111 | where "1" means "change the sign bit" and "0" means "do not change the sign bit". Actual changing of the sign bits of the components on ROM output leads 18b–d is performed by multiplier set 19, which responds to the three outputs of trellis coder 15 on leads 16a–c to either change the sign bit of a respective one of the components on the second, third and fourth ROM output leads 18b–d or not, depending on the coder output value.

Figure 2:
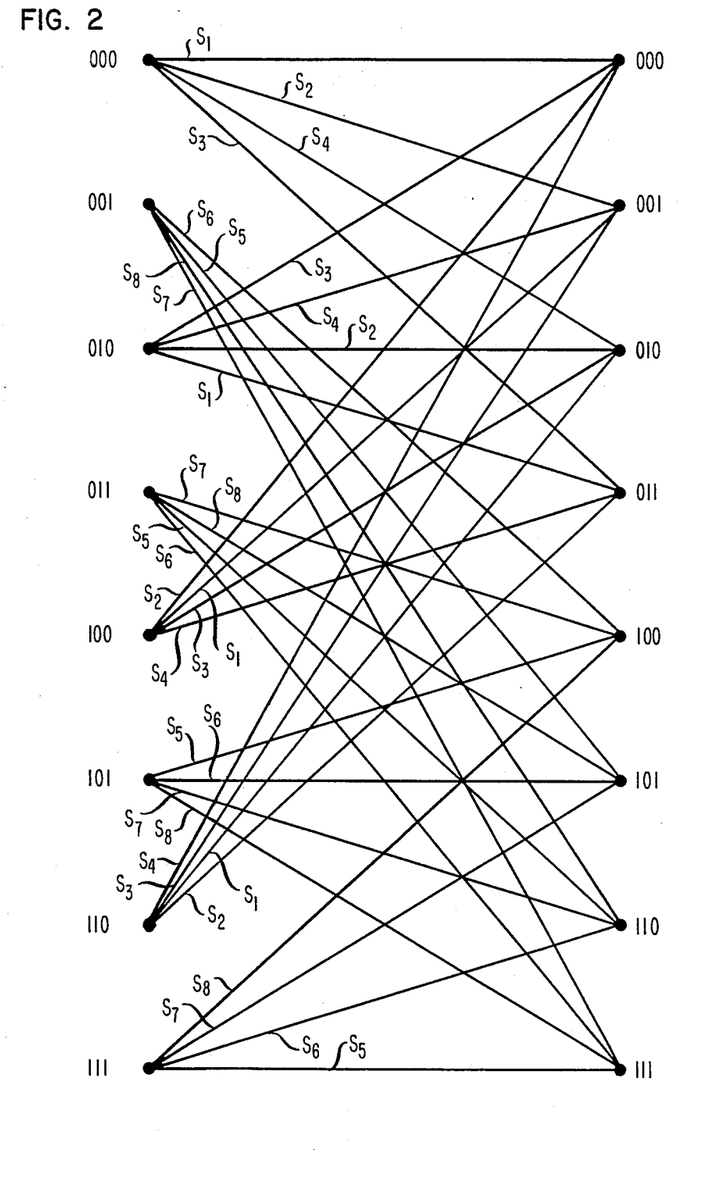
FIG. 2 is a trellis diagram depicting the trellis code used in the transmitter of FIG. 1.

The particular trellis code used to determine which subset each signal point is to come from is represented by the trellis diagram shown in FIG. 2. The coder has eight "states", denoted 000, 100, 010, 110, 001, 101, 011 and 111. The state of a trellis coder is a function of at least one bit of at least one input word received prior to the current input word. In this embodiment, more specifically, the state of the coder is a function of (a) the two bits applied to the coder previous to the two current bits and (b) one of the bits applied to the coder previous to that. Thus, for example, if the coder is in state 001, this means that the two bits previously applied to the coder were "1" and "0" (the bits of the state are read right-to-left) and that one of the bits of the pair applied to the coder before that—illustratively the bit on lead 13b—was "0". Further, if the current bit pair on leads 13a–b is, for example, 11, then the next state will be 111.

The two vertical lines of points in FIG. 2 represent the eight possible coder states at successive time intervals, and the lines connecting various pairs of states indicate the possible state transitions. Thus, for example, it is possible for the coder to transition from state 010 to state 001 but not to state 100.

Each of these connecting lines bears a label indicating which subset the next signal point to be generated is to come from. Thus, continuing the example above, assume that the current state of the coder is 001 and that when the next set of bits is output from S/P converter 11, the bit pair on leads 13a–b is "11". This means that the next signal point to be generated is to come from subset $S_7$ since the line connecting state 001 in the left column to state 111 in the right column is labeled $S_7$.

Figure 3:
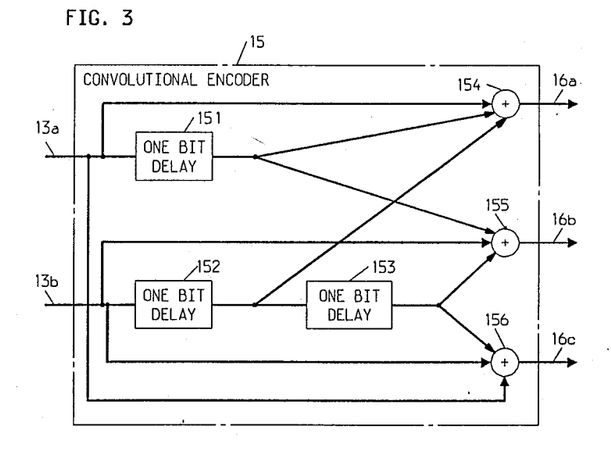
FIG. 3 is a block diagram of the trellis coder used in the transmitter of FIG. 1.

A circuit embodiment of trellis coder 15 is shown in FIG. 3. The two current bits applied to the coder are applied thereto from leads 13a–b. The two bits previously applied to the coder are held in one-bit delay elements 151 and 152. The bit applied to the coder on lead 13b before that is held in one-bit delay element 153, which gets its input from the output of delay element 152. The values held in the three delay elements are applied to binary adders 154, 155 and 156, along with the values of the two current bits on leads 13a–b, in the manner shown. Each binary adder outputs a "0" ("1") if an even (odd) number of its input bits has the value "1". The outputs of adders 154, 155 and 156 constitute the proper sign bit pattern specified by the trellis of FIG. 2 and Table II.

Figure 4:
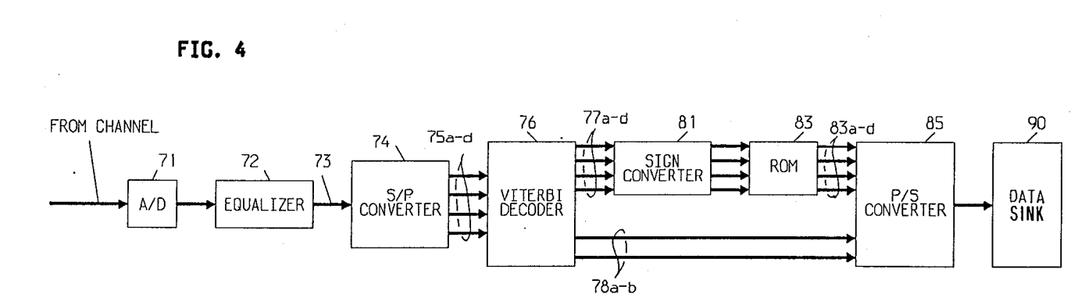
FIG. 4 is a block diagram of a receiver adapted to recover the data encoded and transmitted by the transmitter of FIG. 1.

The receiver of FIG. 4 is of conventional design. In particular, the stream of baseband pulses on the channel is applied to A/D converter 71 and thence through a conventional equalizer 72 which compensates for distortion in the channel and provides a signal on its output lead 73 representing the stream of transmitted data bits.

The bits on lead 73 are converted into multi-bit words by S/P converter 74. Specifically, S/P converter 74 provides on each of its multi-bit output leads 75a–d a multi-bit signal representing the value of a respective one of the four components of a received signal point. In general, these component values are not whole integers, as they were when transmitted, due to a possible myriad of channel effects and impairments that equalizer 72 was not able to compensate for. Thus, a typical received signal point might be, for example, $(-1.1, 3.4, -2.8, 1.0)$.

It is the task of Viterbi decoder 76, which receives the signal points on leads 75a–d, to determine what the most likely sequence of transmitted signal points actually was. Like the rest of the receiver, the Viterbi decoder is of conventional design and need not be discussed in detail. (For details on the operation of Viterbi decoders, see, for example, A. J. Viterbi and J. K. Omura, *Principles of Digital Communication and Coding* (New York: McGraw-Hill) 1979, hereby incorporated by reference.) Rather, it suffices to note that decoder 76 applies the so-called Viterbi algorithm to the trellis of FIG. 2 to determine what the most likely sequence of transmitted signal points was and, in the process, to determine the state of the encoder as each signal point was generated. The estimated sequence of signal points is provided on multi-bit output leads 77a–5 d. In addition, given its knowledge of what the sequence of encoder states was, decoder 76 is able to output on leads 77a–b the values of the two bits that appeared on leads 13a–b in the transmitter at the time that each of the signal points was generated.

The four bits that appeared on leads 12a–d at that time are recovered from the signal point on leads 77a–d. As noted above, each of the 16 possible combinations of "0"s and "1"s on leads 12a–d results in the same pattern of component magnitudes. Those four bits can thus be recovered by converting all of the components of the signal point on leads 77a–d to positive values in sign converter 81 and then looking up the corresponding sequence of "0"s and "1"s in a ROM 83. The bits of the resulting 6-bit word on leads 83a–d and 78a–d are converted to serial form by P/S converter 85 and applied to a data sink 90.

Although the foregoing description has principally focused on the provision of a spectral null at zero frequency, i.e., dc, the principles of the invention can be employed to provide spectral nulls at other frequencies. For example, it is possible to create spectral nulls concurrently at dc and at $\frac{1}{2}T$, where T is the so-called signaling interval, 1/T thus being the symbol, or baud, rate. One way to do this would be to divide the binary input bit stream in two; code each stream independently using the principles of the invention; and then interleave the signal points thus generated. On this point see, for example, J. Pierce, "Some Practical Aspects of Digital Transmission," *IEEE Spectrum*, Vol. 5, 1968, pages 63–70.

Alternatively, the spectral nulls at dc and ¼T can be achieved by having each ROM input word be associated with a group of four signal points in each subset, rather than only two, as in the present illustrative embodiment. After transmission of M signal points, the particular one of the four signal points from the identified group that is to be generated is identified using the following two running values:

$$R_1 = \sum_{i=1}^{4M} x_i$$

$$R_2 = \left(\sum_{i=1}^{2M} x_{2i-1}\right) - \left(\sum_{i=1}^{2M} x_{2i}\right)$$

$R_1$ is, of course, the same running sum used in the illustrative embodiment and $R_2$ is the sum of the first and third components of each transmitted signal point minus the sum of the second and fourth components thereof.

The points of each subset would be arranged in these groups of four in such a way that one point of the group will make both running values more positive, such as the point $(3,-1,3,-3)$; one point of the group will make both running values more negative, such as the point $(-3,1,-3,1)$; one point of the group will make one running value more positive and the other more negative, such as the point $(-1,3,-1,3)$; and one point of the group will make one running value more negative and the other running value more positive, such as the point $(1,-3,1,-3)$. (For purposes of the foregoing, a point that does not change a particular one of the running values can be thought of as making that running value either more positive or more negative.) The particular point chosen, then, will be the one of the four which tends to drive both running values toward zero. To the extent that a particular one of the running values is already zero, then the choice of signal point can be determined solely with reference to the other running value and if both are zero, the point can be chosen arbitrarily.

This approach provides a spectrum that rises more gradually away from the spectral nulls than, for example, the interleaving approach first mentioned, a feature that may render the former more desirable than the latter in many applications.

Further generalization of this approach, using even larger groups of signal points and a corresponding number of running values, could be employed to provide spectral nulls at other desired rational submultiples of the signaling frequency.

The foregoing merely illustrates the principles of the present invention. For example, although a particular alphabet and particular trellis code are used in the illustrative embodiment, it will be appreciated that the present invention can be implemented in a system using any of a myriad of different possible alphabets and trellis codes. Moreover, although the system disclosed herein is embodied in the form of various discrete electronic building blocks and components, the invention could equally as well be embodied in a system in which the functions of any one or more of those building blocks and components or, indeed, all of the functions thereof, are realized by, for example, one or more appropriately programmed processors.

It will thus be appreciated that those skilled in the art will be able to devise numerous arrangements which, although not explicitly shown or described herein, embody the principles of the invention and are thus within its spirit and scope.

What is claimed is:

1. A data transmission system adapted to generate a sequence of output signals in response to a sequence of $(k+n)$-bit input words, each of said output signals representing a respective signal point of a predetermined alphabet of signal points, said system comprising means responsive to the values of n bits of each input word in said input word sequence and the value of at least one bit of a previous input word in said input word sequence for identifying one of $2^m$ predetermined subsets of said alphabet, m being an integer greater than n, means responsive to the other k bits of said each input word for identifying a plurality of signal points of said one subset, and means for generating as an individual one of said sequence of output signals a signal representing a selected one of said plurality of signal points, said one of said signal points being selected as a function of the components of the signal points represented by previously generated ones of said output signals.

2. The invention of claim 1 wherein said one of said signal points is selected in response to a running sum of the components of the signal points represented by previously generated ones of said output signals.

3. The invention of claim 2 wherein each said plurality of signal points is a pair of signal points, wherein the sum of the components of one of the signal points of said pair is at least equal to a particular predetermined value and the sum of the components of the other of the signal points of said pair is no greater than said particular predetermined value and wherein said generating means selects said one of said signal points of said pair if said running sum is less than said particular predetermined value and selects said other of said signal points of said pair if said running sum is greater than said particular predetermined value.

4. The invention of claim 3 wherein each of the components of the signal points of said alphabet is an odd integer.

5. The invention of claim 3 wherein said particular predetermined value is zero.

6. The invention of claim 3 wherein each of the components of said one of said signal points of said pair has the same magnitude as, and opposite sign of, a corresponding component of said other of said signal points of said pair.

7. A data transmission system adapted to generate a sequence of signal points each representing a respective input word of a sequence of $(k+n)$-bit input words, each of said signal points being selected from a predetermined alphabet of $2^{(k+m+l)}$ signal points, k, m and n being predetermined integers where m is greater than n, said system comprising means for identifying one of $2^m$ predetermined subsets of said alphabet for each input word of said input word sequence in response to the values of n bits of said each input word and the value of at least one bit of a previous input word in said input word sequence, means responsive to the other k bits of said each input word for identifying a pair of signal points of said one subset, and means for generating a selected one of said pair of signal points in response to the values of the components of previous signal points of said signal point sequence.

8. The invention of claim 7 wherein said means for generating generates said selected one of said pair of signal points in response to a running sum of said values.

9. The invention of claim 8 wherein the sum of the components of one of the signal points of said pair is at least equal to a particular predetermined value and the sum of the components of the other of said signal points of said pair is no greater than said particular predetermined value and wherein said generating means generates said one of said signal points of said pair if said running sum is less than said particular predetermined value and generates said other of said signal points of said pair if said running sum is greater than said particular predetermined value.

10. The invention of claim 9 wherein each of the components of each of the signal points of said alphabet is an odd integer.

11. The invention of claim 9 wherein said particular predetermined value is zero.

12. The invention of claim 9 wherein said alphabet is partitioned such that each subset that includes a particular one of the signal points of said alphabet also includes a signal point each of whose components is the negative of the corresponding component of said particular one signal point.

13. A data transmission system for generating a sequence of signal points each representing a respective one of a sequence of (k+n)-bit input words, k and n being predetermined integers, each of said signal points being selected from a predetermined alphabet of signal points, divided into $2^m$ subsets, m being an integer greater than n, each of said subsets comprising $2^k$ pairs of signal points, the sum of the components of one signal point of at least ones of said pairs being at least equal to a particular predetermined value and the sum of the components of the other signal point of each of said at least ones of said pairs being no greater than said particular predetermined value, said system comprising means for maintaining a running sum of the values of the components of signal points already generated by said system, encoder means responsive to n of the bits of a particular input word of said input word sequence and at least one bit of a previous input word of said sequence for identifying the subset containing the signal point to be generated to represent said particular input word, said encoder means being further responsive to the other k bits of said particular input word for identifying the particular one of said pairs in said subset containing said signal point to be generated, said encoder means being further responsive to the relative values of said running sum and said particular predetermined value for identifying one of the signal points of said particular one of said pairs as said signal point to be generated.

14. The invention of claim 13 wherein said particular predetermined value is zero and wherein said encoder means identifies said first signal point of said particular one of said pairs when said running sum is less than zero and identifies said other signal point of said particular one of said pairs when said running sum is greater than zero.

15. A data transmission system comprising means operative for generating in response to each of a series of received multi-bit input words an individual signal point of a predetermined alphabet of signal points, divided into $2^m$ subsets, each of said subsets comprising $2^k$ pairs of signal points, m and k being integers, the sum of the components of the first signal point of at least ones of said pairs being no less than a particular predetermined value and the sum of the components of the other signal point of each said at least ones of said pairs being no more than said particular predetermined value, and means for maintaining a running sum of the values of the components of the signal points previously generated by said data transmission system, each of said input words comprising (k+n) bits, n being less than m, and said generating means being adapted to trellis-code n bits of successive ones of said input words to identify a particular one of said subsets as containing the signal point to be generated, said generating means being further adapted to identify a particular one of said pairs associated with the other k bits of said particular input word, said identified signal point being said first signal point of said particular one of said pairs if said running sum is less than said particular predetermined value and being said other signal point of said particular one of said pairs if said running sum is greater than said particular predetermined value.

16. The invention of claim 15 wherein each of the components of each of the signal points of said alphabet is an odd integer.

17. The invention of claim 15 wherein said particular predetermined value is zero.

18. The invention of claim 15 wherein said alphabet is partitioned such that each subset that includes a particular one of the signal points of said alphabet also includes a signal point each of whose components is the negative of the corresponding component of said particular one signal point.

19. A data transmission system of the type in which individual signal points are selected from a predetermined signaling alphabet for transmission over a transmission channel as a function of a sequence of input words at least ones of whose bits have been trellis coded, said system comprising means for maintaining a running value which is a function of the components of the individual signal points, and means for selecting said individual signal points for transmission further as a function of said maintained value.

20. The invention of claim 19 wherein said running value is a running sum of the components of the selected signal points.

21. A method for use in a data transmission system adapted to generate a sequence of output signals in response to a sequence of (k+n)-bit input words, each of said output signals representing a respective signal point of a predetermined alphabet of signal points, said method comprising the steps of identifying one of $2^m$ predetermined subsets of said alphabet in response to the values of n bits of each input word in said input word sequence and the value of at least one bit of a previous input word in said input word sequence, m being an integer greater than n, identifying a plurality of signal points of said one subset in response to the other k bits of said each input word, generating as an individual one of said sequence of output signals a signal representing a selected one of said plurality of signal points, said one of said signal points being selected as a function of the components of the signal points represented by previously generated ones of said output signals.

22. The invention of claim 21 wherein said one of said signal points is selected in response to a running sum of the components of the signal points represented by previously generated ones of said output signals.

23. The invention of claim 22 wherein each said plurality of signal points is a pair of signal points, wherein the sum of the components of one of the signal points of said pair is at least equal to a particular predetermined value and the sum of the components of the other of the signal points of s id pair is no greater than said particular predetermined value and wherein in said generating step said one of said signal points of said pair is selected if said running sum is less than said particular predetermined value and said other of said signal points of said pair is selected if said running sum is greater than said particular predetermined value.

24. The invention of claim 23 wherein each of the components of the signal points of said alphabet is an odd integer.

25. The invention of claim 23 wherein said particular predetermined value is zero.

26. The invention of claim 23 wherein each of the components of said one of said signal points of said pair has the same magnitude as, and opposite sign of, a corresponding component of said other of said signal points of said pair.

27. A method for use in a data transmission system adapted to generate a sequence of signal points each representing a respective input word of a sequence of (k+n)-bit input words, each of said signal points being selected from a predetermined alphabet of $2^{(k+m+l)}$ signal points, k, m and n being predetermined integers where m is greater than n, said method comprising the steps of identifying one of $2^m$ predetermined subsets of said alphabet for each input word of said input word sequence in response to the values of n bits of said each input word and the value of at least one bit of a previous input word in said input word sequence, identifying a pair of signal points of said one subset in response to the other k bits of said each input word, and generating a selected one of said pair of signal points in response to the values of the components of previous signal points of said signal point sequence.

28. The invention of claim 27 wherein in said generating step said selected one of said pair of signal points is generated in response to a running sum of said values.

29. The invention of claim 28 wherein the sum of the components of one of the signal points of said pair is at least equal to a particular predetermined value and the sum of the components of the other of said signal points of said pair is no greater than said particular predetermined value and wherein in said generating step said one of said signal points of said pair is generated if said running sum is less than said particular predetermined value and said other of said signal points of said pair is generated if said running sum is greater than said particular predetermined value.

30. The invention of claim 29 wherein each of the components of each of the signal points of said alphabet is an odd integer.

31. The invention of claim 29 wherein said particular predetermined value is zero.

32. The invention of claim 29 wherein said alphabet is partitioned such that each subset that includes a particular one of the signal points of said alphabet also includes a signal point each of whose components is the negative of the corresponding component of said particular one signal point.

33. A method for use in a data transmission system of the type in which individual signal points are selected from a predetermined signaling alphabet for transmission over a transmission channel as a function of a sequence of input words at least ones of whose bits have been trellis coded, said method comprising the steps of maintaining a running value which is a function of the components of the individual signal points, and selecting said individual signal points for transmission further as a function of said maintained value.

34. The invention of claim 33 wherein said running value is a running sum of the components of the selected signal points.

* * * * *